United States Patent [19]

Alley et al.

[11] Patent Number: 4,764,714
[45] Date of Patent: Aug. 16, 1988

[54] ELECTRONIC STARTING CIRCUIT FOR AN ALTERNATING CURRENT MOTOR

[75] Inventors: Robert P. Alley, Clifton Park; William P. Kornrumpf, Albany; John D. Harnden, Jr., Schenectady, all of N.Y.

[73] Assignee: General Electric Company, Schenectady, N.Y.

[21] Appl. No.: 138,733

[22] Filed: Dec. 28, 1987

[51] Int. Cl.$^4$ ............................................. H02P 1/44
[52] U.S. Cl. ..................... 318/786; 318/778
[58] Field of Search ................... 318/786, 778, 779

[56] References Cited

U.S. PATENT DOCUMENTS

| 4,382,217 | 5/1983 | Horner et al. | 318/778 |
| 4,401,933 | 8/1983 | Davy et al. | 318/778 |
| 4,453,118 | 6/1984 | Phillips et al. | 318/779 |

Primary Examiner—David Smith, Jr.
Attorney, Agent, or Firm—Marvin Snyder; James C. Davis, Jr.

[57] ABSTRACT

A circuit is provided for controlling energization of the start winding of an alternating current motor whose shaft is divided into a number of angular segments equal to the number of poles of the motor. A shaft pulse is generated each time one of the angular segments rotates past a predetermined point. A line pulse is generated for each half cycle of line voltage. The shaft pulses are multiplied by the denominator of a selected trip-out ratio while the line pulses are multiplied by the numerator of the trip-out ratio. The multiplied shaft and line pulses are provided to an up/down counter which counts the shaft pulses down and the line pulses up. During the counter overflow condition, the circuit connects the start winding to the line voltage source. During the counter underflow condition, the circuit disconnects the start winding from the line voltage source.

11 Claims, 4 Drawing Sheets 4,764,714

ELECTRONIC STARTING CIRCUIT FOR AN ALTERNATING CURRENT MOTOR

BACKGROUND OF THE INVENTION

This invention relates in general to alternating current induction motor start circuits and, more particularly, to electronic control circuits for coupling and decoupling the start winding of such alternating current motors from a line voltage source.

BRIEF SUMMARY OF THE INVENTION

Alternating current induction motors depend upon interaction between rotating magnetic fields in a stator and magnetic fields in a rotor, generated by transformer action between windings of the stator and windings of the rotor. Polyphase motors have an inherent rotating magnetic field as a result of the phase difference between each of the phases of the exciting current. Single phase induction motors lack this inherent field rotation and thus generally are constructed with a main winding and an auxiliary or start winding. The axes of the two windings are displaced 90 electrical degrees. The start winding generally has a higher resistance-to-reactance ratio than the main winding so that the two currents are out of phase. The result is a rotating magnetic stator field which causes the motor to start. After starting, a switch disconnects the start winding. Additional phase displacement can be obtained in such split-phase motors by use of a capacitor with the auxiliary start winding.

Several devices have been devised in the prior art to remove or disconnect the start winding from the line voltage source once the induction motor has achieved a predetermined percentage of synchronous speed. For example, various mechanical devices have been devised which employ centrifugal force to cause a pair of electrical contacts to break contact and thus disconnect the start winding from the voltage source once a selected rotor speed has been reached. Such mechanical devices typically are set to break such contact with the line voltage source when the induction motor reaches 75-80% of the synchronous speed of such motor. Unfortunately, the relatively high currents typically associated with the start winding sometimes result in the contacts of the aforementioned centrifugal force-actuated device being welded together. The mechanical design of such devices must provide sufficient force to actually break the welded contacts apart before reliable starting circuit performance can be obtained. Thus, reliability is a substantial concern when a mechanical centrifugal force-actuated device is used to control the decoupling of the start winding.

Accordingly, one object of the present invention is to provide an electronic starting circuit for an induction motor which reliably disconnects the start winding from the voltage source when a predetermined percentage of synchronous speed is reached.

Another object of the present invention is to provide an electronic starting circuit which employs no mechanical switches to decouple the start winding from the line voltage source.

Yet another object of the present invention is to provide an electronic starting circuit which is inexpensive to manufacture.

In a preferred embodiment of the invention, a starting control circuit is provided for an alternating current induction motor of the type having a split-phase stator winding comprising a main winding and a start winding. The motor further includes a rotor mounted on a rotatable shaft, the motor being adapted to be coupled to a line voltage source. The starting circuit includes a shaft pulse generating circuit for generating a first shaft pulse each time the shaft turns an amount equal to 360 degrees divided by the number of stator poles. The starting circuit further includes a line pulse generating circuit for generating a first line pulse at a fixed proportional rate relative to the line voltage frequency, such as each time the line voltage completes a half cycle of line voltage (i.e., twice the line voltage frequency). A first multiplier circuit is coupled to the shaft pulse generating circuit, for multiplying each first shaft pulse by a first constant, M, to generate M second shaft pulses for each first shaft pulse provided thereto. A second multiplier circuit is coupled to the line pulse generating circuit for multiplying each line pulse by a second constant, N, to generate N second line pulses for each first line pulse provided thereto. An up/down counter, preferably implemented by a shift register, is coupled to the first and second multiplier circuits for counting up the second line pulses and counting down the second shaft pulses. The counter exhibits an overflow when more second line pulses are counted than second shaft pulses. The counter exhibits an underflow when more second shaft pulses are counted than second line pulses. The starting circuit includes a coupling/decoupling circuit, responsive to the counter, for coupling the start winding to the line voltage source when the counter overflows and for decoupling the start winding from the line voltage source when the counter underflows.

BRIEF DESCRIPTION OF THE DRAWINGS

The features of the invention believed to be novel are specifically set forth in the appended claims. However, the invention itself, both as to its structure and method of operation, may best be understood by referring to the following description and the accompanying drawings in which:

DETAILED DESCRIPTION OF THE INVENTION

Figure 1:
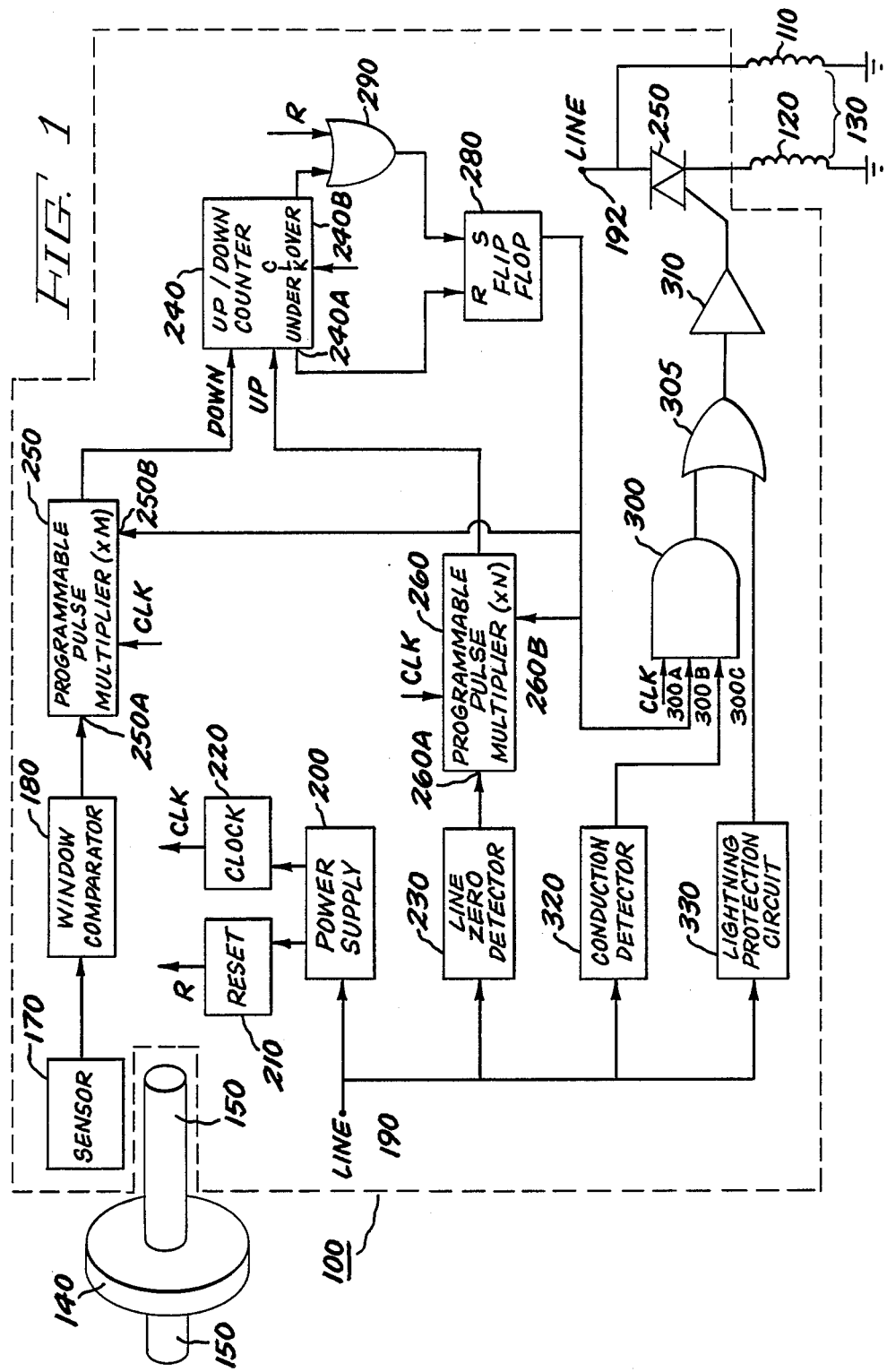
FIG. 1 is a block diagram of the electronic starting circuit of the present invention.

In FIG. 1, a preferred embodiment of the invention is shown as electronic starting circuit 100. Starting circuit 100 is coupled to main stator winding 110 and auxiliary or start winding 120 of induction motor 130. The rotor and shaft of induction motor 130 are represented diagrammatically as rotor 140 which is coaxially mounted on shaft 150.

For purposes of this example, it will be assumed that motor 130 is a ten-pole induction motor. That is, stator 110 includes ten poles substantially equally radially spaced about the rotor 140. It should be noted, however, that although in this example the induction motor has ten poles (P=10), the invention is readily adaptable to induction motors having any number of poles.

Figure 2:
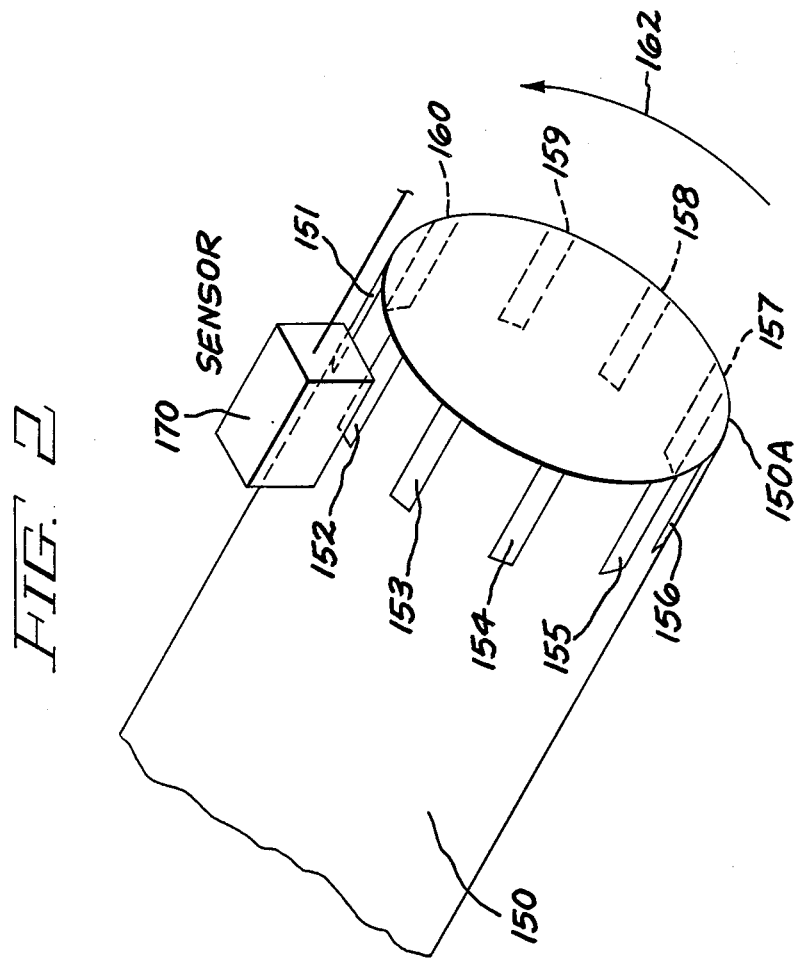
FIG. 2 is a close up perspective view of the end of a rotor shaft which includes magnetized portions in accordance with the present invention.

Referring momentarily to FIG. 2, a close-up view of one end 150A of the shaft 150 is shown. Shaft 150 includes P magnetized portions equiangularly spaced around the circumference of shaft 150. Thus, in this embodiment, shaft 150 includes ten magnetized portions 151, 152, 153, 154 ... 160 as shown in FIG. 2. Alternatively, magnetized portions 151, 152 ... 160 may be situated around the circumference of a disk (not shown) coaxially mounted on shaft 150. An arrow 162 in FIG. 2 indicates the direction of rotation of shaft 150. A Hall effect sensor 170 is situated sufficiently close to shaft 150 to sense magnetized portions 151-160 as they move past sensor 170 when shaft 150 rotates. Sensor 170 generates DC output signals of magnitude proportional to intensity of the sensed magnetized field. More specifically, sensor 170 generates an identifiable signal each time one of the magnetized portions 151-160 rotates past sensor 170.

Returning again to FIG. 1, the output of sensor 170 is coupled to the input of a window comparator 180. Hall effect sensors such as sensor 170 generally do not generate a pure output signal. That is, as the magnetic portions 151-160 respectively approach and then pass by sensor 170, the sensor generates a series of pulses which typically include a number of minute variations or noise. Window comparator 180 serves to effectively clean up the sensor output signal. More specifically, window comparator 180 generates a logical 1 when the sensor output signal exceeds a first predetermined threshold and generates a logical 0 when the sensor output falls below a second predetermined threshold less than the first threshold. The output signal of window comparator 180 is thus a digital signal with a logical 1 being generated each time sensor 170 detects one of magnetic portions 151-160 passing by. It is noted that the output signal of window comparator 180 gives an indication of the angular speed at which shaft 150 of motor 130 is rotating. That is, for each revolution of shaft 150, comparator 180 generates a number of pulses equal to the number of magnetized portions situated around the circumference of shaft 150, namely ten. Thus, for each revolution of shaft 150, comparator 180 generates a number of pulses equal to the number of poles of motor 130.

A line voltage source (not shown) is connected to line inputs 190 and 192 through a conventional switch (not shown). In actual practice, line inputs 190 and 192 are the same node. Line input 190 is coupled to a power supply 200 which supplies direct current voltage to the remaining circuits of starter circuit 100. These remaining circuits may conveniently be implemented as an application specific integrated circuit (ASIC).

Power supply 200 is coupled to a conventional reset circuit 210 which generates a one-shot pulse when power supply 200 is turned on. The one-shot pulse generated at turn-on by reset circuit 210 is used to reset other circuits in starting circuit 100 in a manner later described.

A clock circuit 220 is coupled to an output of power supply 200 to derive power therefrom. Clock circuit 220 generates a clock signal at an output designated CLK. The clock signal is generated at a frequency greater than that of the line voltage provided to input 190. For example, when the line voltage at input 190 is at a frequency of 60 Hz, it has been found that a clock frequency of approximately 5-10 KHz is sufficiently fast. The output of clock circuit 220 is coupled to later specific circuits within starting circuit 100 to provide an appropriate clock signal thereto.

Figure 3A:
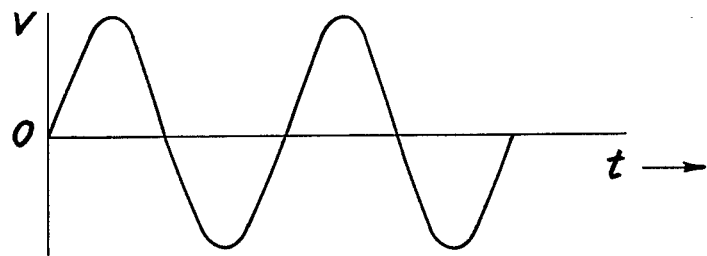
FIG. 3A is a voltage amplitude vs. time representation of the line voltage supplied to the circuit of the present invention.
Figure 3B:
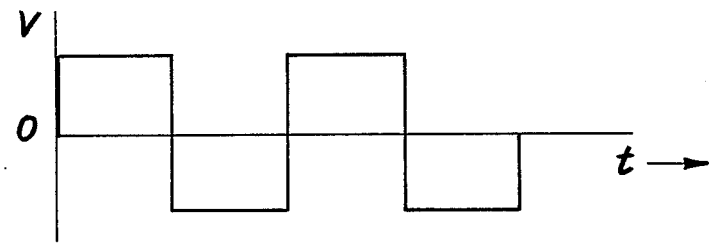
FIG. 3B is a representation of the waveform generated by the line zero detector of the present invention in response to the waveform of FIG. 3A.

Line input 190 is also coupled to the input of a line zero detector 230 which generates a substantially square wave output signal in sync with the sinusoidal line voltage supplied thereto. That is, when a sinusoidal line voltage signal such as that shown in FIG. 3A is provided to the input of line zero detector 230, a line pulse signal such as that shown in FIG. 3B is generated at the output of detector 230. It should be noted that each leading edge of the line pulse signal of FIG. 3B corresponds to a positive-going zero crossing of the line voltage signal of FIG. 3A.

When a motor 130 is operating synchronously with respect to the line voltage signal, the number of shaft pulse signals which window comparator 180 generates is equal to the number of positive going line pulses at line zero detector 230.

Starting circuit 100 includes an up/down shift register or counter 240 for receiving shaft pulses and line pulses. This counter or shift register counts down when provided a shaft pulse and counts up when provided a line pulse, and includes both an underflow output 240A and an overflow output 240B.

Circuit 100 is configured such that when counter 240 overflows, a triac 250 is turned on to apply line voltage from line voltage input 192 to start winding 120. When counter 240 underflows, triac 250 is turned off to disconnect line voltage input 192 from start winding 120. More specifically, triac 250 is switched off when a predetermined percentage, such as 80%, of synchronous shaft speed is attained. This is referred to as 80% trip-out or an 8/10 trip-out ratio or speed ratio. In this example wherein the triac is turned off at 80 percent of synchronous motor speed, circuit 100 is configured such that underflow of counter 240 is attained when 80% trip-out corresponds to the ratio of 8/10 or simply 4/5. The goal is to have an equal number of shaft pulses and line pulses reaching the input of counter 240 when 80% of synchronous speed is attained. To assure that this condition occurs, the number of shaft pulses from comparator 180 is multiplied by an integer M=5 prior to being provided to counter 240 and the number of line pulses generated from detector 230 is multiplied by an integer N=4 prior to being provided to counter 240. More specifically, the output of window comparator 180 is coupled to the input of a programmable pulse multiplier 250. Multiplier 250 is programmed with a multiplier M equals 5 such that for each shaft pulse provided at pulse input 250A, five shaft pulses are generated at the output thereof. In addition, a programmable pulse multiplier 260 is coupled to the output of line zero detector 230. Multiplier 260 is programmed with a multiplier of N equals 4 such that for each line pulse provided at pulse input 260A, multiplier 260 generates four line pulses at its output. Multiplier 250 includes an M select input 250B to enable two different integer multipliers M to be selected in response to a signal provided to input 250B as will be discussed later in more detail. Similarly, multiplier 260 includes an N select multiplier input which will also be discussed in more detail later.

The output of programmable pulse multiplier 260 is coupled to up/down counter 240 such that counter 240 counts up the line pulses supplied thereto. The output of programmable pulse multiplier 250 is coupled to up/down counter 240 such that counter 240 counts down the shaft pulses supplied thereto. The underflow output 240A of counter 240 is coupled to the reset input R of RS flip flop 280. Thus, flip flop 280 resets when register 240 underflows as will be discussed later. The overflow output 240B of counter 240 is coupled to one input of a two-input OR gate 290. The remaining input of OR gate 290 is coupled to the R output of reset circuit 210. The output of OR gate 290 is coupled to the set input S of RS flip flop 280. Thus when register 240 overflows, signifying a shaft velocity less than 80% of the synchronous motor speed, flip flop 280 is set to a high output state.

The output of flip flop 280 is coupled to one input of a three-input AND gate 300. The output of AND gate 300 is coupled to a first input of a two-input OR gate 305. The output of OR gate 305 is coupled by a buffer amplifier 310 to the gate of triac 250. Thus, when counter 240 overflows, signifying shaft speed less than the 80% trip-out, the output of AND gate 300 goes high (assuming that the remaining two inputs of AND gate 300 are also high). Thus the output of OR gate 305 goes high such that triac 250 is turned on to couple line voltage to start winding 120. Conversely, when counter 240 underflows, signifying that the 80% trip-out speed has been exceeded, flip flop 280 is reset such that its output assumes a logical 0 state. Hence the output of AND gate 300 also goes low, sending the output of OR gate 305 low and turning off triac 250. When triac 250 is turned off, start winding 120 is decoupled from the source of line voltage.

Figure 4:
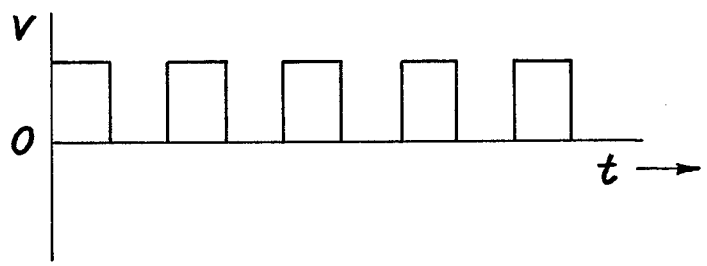
FIG. 4 is a representation of the waveform of the clock signal generated by the clock circuit of the invention.

Prior to discussing operation of starting circuit 100 from power-up until synchronous shaft speed is reached, conduction detector 320 and lightning protection circuit 330 are briefly described. When any one of the three AND gate inputs 300A–300C is low, then the outputs of AND gate 300 and OR gate 305 are low such that triac 250 is turned off, disconnecting line voltage from start winding 120. The purpose of conduction detector 320 is to assure that triac 250 is turned on each time the line voltage half-cycle becomes positive and each time the line voltage half-cycle becomes negative. Conduction detector 320 thus assures that triac 250 is not gated on during positive or negative peaks in the line voltage cycle. The sinusoidal line voltage, which exhibits a frequency $F=60$ Hz in this example, is provided to the input of conduction detector 320. Just after the line voltage, shown in FIG. 3A, exhibits a positive-going or negative-going zero crossing, conduction detector 320 generates a pulse, as shown graphically in FIG. 4. The output of conduction detector 320 is coupled to input 300C of AND gate 300. Thus, conduction detector 320 assures that triac 250 is turned on only after a positive-going or negative-going zero crossing of the line voltage cycle, assuming that the appropriate conditions are present at the remaining AND gate inputs 300A and 300B.

Figure 5A:
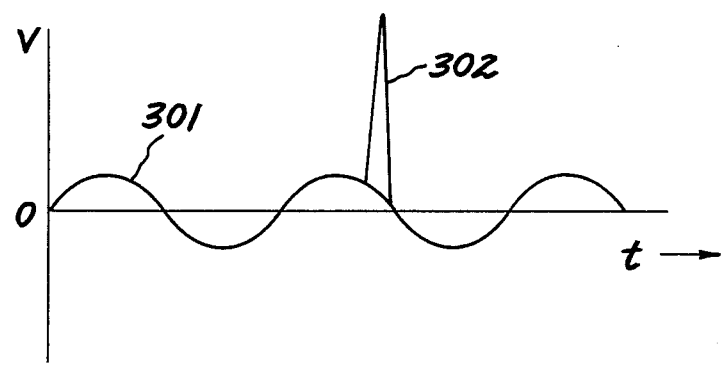
FIG. 5A is a representation of the line voltage signal including a significant voltage spike.
Figure 5B:
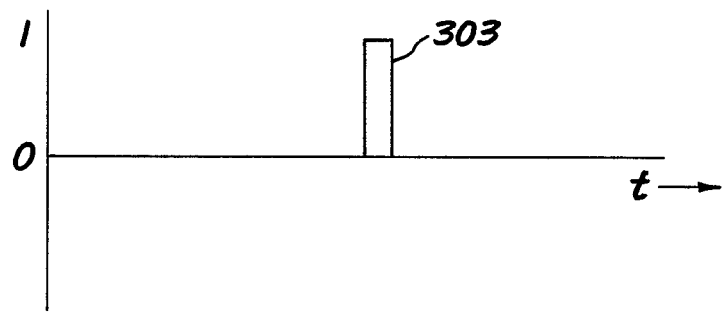
FIG. 5B is a representation of the waveform generated by the lighting protection circuit in response to the line voltage waveform of FIG. 5A.

Starter circuit 100 includes a lightning protection circuit 330 coupled between line voltage input 190 and the second input of OR gate 305. A graphical representation of the line voltage signal 301 provided to the input of lightning protection circuit 330 is shown in FIG. 5A. FIG. 5B shows the output waveform of lightning protection circuit 330 over time with respect to the line voltage waveform of FIG. 5A. Generally, lightning protection circuit 330 generates a logical 0 for all times at which the line voltage provided thereto remains within the normal amplitude range associated with such signals, for example within plus or minus 120 volts for a 120-volt motor 130. However, if there is a lightning strike or other condition which causes a high voltage line transient, such as spike 302 shown in FIG. 5A, then protection circuit 330 generates a logical 1 output signal 303 for the duration of such spike 302, as shown in FIG. 5B. When the spike condition ends, protection circuit 330 resumes generating a logical 0 output signal. Since the output of protection circuit 330 is coupled to the second input of OR gate 305, triac 250 and start winding 120 are turned on for the duration of spike 302. In this manner, the entire circuit 100 including triac 250 is protected from destructive line transient over-voltages. For all other times during which the line voltage exhibits an amplitude within the normal range, protection circuit 330 provides a logical 0 to the second input of OR gate 305 such that the state of triac 250 is controlled by the state of AND inputs 300A, 300B and 300C.

The following is a general description of the operation of starting circuit 100 from power-on-reset through trip-out and final attainment of synchronous shaft speed. Before starter circuit 100 is energized by switchably connecting line voltage to line inputs 190 and 192, motor 130 is in a deenergized state such that shaft 150 and rotor 140 are not turning. When line voltage is applied to line inputs 190 and 192, power supply 200 starts to generate output voltages which are supplied to reset circuit 210 and clock 220. Reset circuit 210 then immediately generates a reset pulse at its output R before clock circuit 220 starts to generate clock pulses. The reset pulse produced by reset circuit 210 is graphically shown in FIG. 6 as a one-shot pulse 340. Since the R output of reset circuit 210 is coupled to an input of OR gate 290, the output of OR gate 290 immediately goes high. Flip flop 280 reacts to the logical 1 signal now appearing at its S input by becoming set such that its output goes high. Since the output of flip flop 280 is set to a logical 1, input 300B of AND circuit 300 is also set at a logical 1 state. Hence, when the line voltage is initially turned on, starting circuit 100 is reset such that AND gate input 300B goes high prior to the generation of any clock pulses which would be provided to AND gate 300 at input 300A. At this juncture, the reset of starting circuit 100 having just occurred, the output of AND gate 300 remains low and the output of OR gate 305 remains low, so that triac 230 and start winding 120 are turned off.

Figure 6:
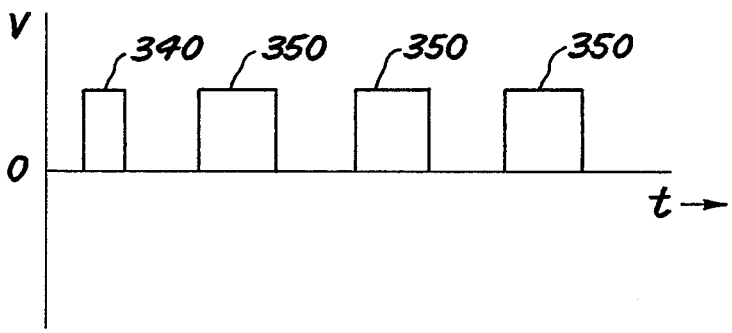
FIG. 6 is a representation of the reset pulse and the following clock pulses generated by the reset circuit and clock circuits, respectively.

After reset pulse 340 is generated, clock circuit 220 starts generating clock pulses 350 as shown in FIG. 6. Since AND gate input 300B is already high due to the prior reset, and input 300C is also high in accordance with prior discussion, as soon as the first clock pulse 350 is received by AND gate input 300A, all three inputs of AND gate 300 are simultaneously high causing the output of AND gate 300 to go high. When this occurs, the output of OR gate 305 goes high and triac 250 is turned on, thus coupling starting winding 120 to the line voltage at line input 192. In this manner, when the first clock pulse is supplied to AND gate input 300A, start winding 120 is coupled to the line voltage supply, and rotor 140 and shaft 150 start to turn due to the magnetic interaction of start winding 120 and stator windings 110. Once motor 130 is thus started, the angular velocity of shaft 150 increases with each successive half cycle of line voltage, up to its preselected percentage of synchronous speed, while start winding 120 is energized.

In the present example wherein trip-out is selected to occur at 80% of the synchronous motor speed, since multipliers 250 and 260 are programmed with M=5 and N=4, respectively, when 4/5 or 80% synchronous motor speed is reached and then exceeded, up/down counter 240 just starts to underflow. However, from the time at which the shaft 150 starts to rotate until just before the trip-out point is reached, more line pulses than shaft pulses are provided to up/down counter 240. Therefore, during the period of time from start-up to just before the trip-out, up/down counter 240 generates an overflow or logical 1 at overflow output 240B. This causes the OR gate 290 output to go high and set flip flop 280, thus providing a logical 1 at AND gate input 300B. Assuming that input 300C is high, then since input 300B is also high, the output of AND gate 300 goes high on the next clock pulse. Triac 250 thus turns on and couples the start winding 120 to the line voltage source. Accordingly, during the motor speed interval between start-up and just before the 80% trip-out, more line pulses than shaft pulses are provided to up/down counter 240, such that triac 250 is turned on to connect and energize start winding 120. However, once the angular speed of shaft 150 increases beyond the 80% trip-out point, multiplier 250 starts to provide up/down counter 240 with more shaft pulses per unit of time than the number of line pulses provided to it by multiplier 260 in the same interval. Under these conditions, counter 240 empties and starts to underflow, such that underflow output 240A goes high. This causes flip flop 280 to be reset such that AND gate input 300B goes low, thus deenergizing triac 250 and start winding 120. Therefore, once the 80% trip-out point is exceeded so that more shaft pulses than line pulses reach up/down counter 240, counter 240 underflows and causes triac 250 and start winding 120 to be turned off. Once the start winding 120 is so disconnected, shaft speed continues to increase from the 80% trip-out point until full synchronous speed is approached. The up/down counter 240 is preferably implemented using an up/down shift register, although it may, alternatively, be implemented by up/down binary counter.

Trip-out points or speed ratios of other than 80% are easily programmed into starter circuit 100. For example, if a trip-out point of 70% or 7/10 is desired, then multiplier 250 is programmed such that it multiplies each pulse by 10 (M=10). In that case, multiplier circuit 250 generates ten shaft pulses at the output thereof for each shaft pulse provided to its input. Multiplier 260 is programmed such that it multiplies each pulse by 7 (N=7). Thus multiplier 260 generates seven line pulses at the output thereof for each line pulse provided to its input. When the selected 70% trip-out point is reached, the number of shaft pulses and line pulses reaching up/down counter 240 is approximately equal, due to the action of multipliers 250 and 260. At rotor shaft speeds corresponding to less than the 70% trip-out point, more line pulses than shaft pulses reach up/down counter 240. Counter 240 consequently overflows to render triac 250 conductive and thereupon energize start winding 120 while rotor shaft speed is less than 70% trip-out.

However, when the rotor shaft reaches a speed greater than the 70% trip-out point, then more shaft pulses than line pulses reach up/down counter 240. Counter 240 then underflows to render triac 250 nonconductive and deenergize start winding 120 for rotor shaft speeds greater than 70% trip-out or speed ratio.

It has been found that if a load increase or any other condition occurs which slows the motor down, a trip-out point or speed ratio of approximately 50% is preferred at which to reapply power to the start winding. Accordingly, the output state of flip flop 280 is used to modify the speed ratio associated with the programmable pulse multipliers 250 and 260 such that M=2 and N=1 (or an equivalent ratio such as 4/2) after the motor reaches the "start-up speed" or "started condition" (that is, when counter 240 starts to underflow). To accomplish this, the output of flip flop 280 is coupled to an M select input 250B of programmable pulse multiplier 250 and to an N select input 260B of programmable pulse multiplier 260. While the output of flip flop 280 is still high, indicating counter 240 overflow and that "start-up speed" has not yet been reached, then providing a logical 1 at multiplier inputs 250B and 260B causes a first speed ratio (for example 70%, M=10 and N=7) to be programmed into multipliers 250 and 260. However, when the output of flip flop 280 goes low, indicating counter 240 underflow and that motor "start-up speed" has been reached, then providing a logical 0 at multiplier inputs 250B and 260B causes a second speed ratio (for example 50%, M=10 and N=5) to be programmed into multipliers 250 and 260. In this manner, a variable speed ratio is provided for motor start and restart.

From the above description, it is clear that the invention involves a method of controlling the start winding of an alternating current (AC) motor. The motor employed in the method includes a stator having a plurality of stator poles. The motor employed further includes a rotor mounted on a rotatable shaft, such motor being coupled to an AC line voltage source. The method of controlling the start winding of such motor includes the steps of generating a first shaft pulse each time the shaft turns an amount equal to 360 degrees divided by the number of stator poles. The method further includes the step of generating a first line pulse each time the line voltage completes a half cycle, and the step of multiplying each first shaft pulse by a first constant, M, to generate M second shaft pulses for each first shaft pulse. Each line pulse is multiplied by a second constant, N, to generate N second line pulses for each first line pulse. The method further includes the step of providing the second line pulses to an up/down counter to cause the counter to count up and providing the second shaft pulses to the up/down counter to cause the counter to count down. When the counter overflows, the start winding is coupled to the line voltage source and when the counter underflows, the start winding is decoupled from the line voltage source.

The foregoing describes an apparatus and method for controlling energization of the start winding of an alternating current motor, such as an induction motor, which reliably connects and disconnects the start winding from the voltage source without using mechanical switches. The electronic starting circuit provided by the invention has the additional advantage that it is inexpensive to manufacture.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A starting control circuit for an alternating current motor, the motor including a stator having at least one pole and a rotor mounted on a rotatable shaft exhibiting a circumference, said motor further including a start winding and being adapted to be coupled to a line voltage source, said circuit comprising:

shaft pulse generating means for generating a first shaft pulse each time the shaft turns an amount equal to 360 degrees divided by the number of poles;

line pulse generating means for generating a first line pulse at a fixed proportional rate relative to the line voltage frequency;

first multiplying means, coupled to said shaft pulse generating means, for multiplying each first shaft pulse by a first constant, M, to generate M second shaft pulses for each first shaft pulse provided thereto;

second multiplying means, coupled to said line pulse generating means, for multiplying each line pulse by a second constant, N, to generate N second line pulses for each first line pulse provided thereto;

up/down counter means, coupled to said first and second multiplying means, for counting up said second line pulses and counting down said second shaft pulses, said counter means exhibiting overflow when more second line pulses are counted than second shaft pulses, said counter means exhibiting underflow when more second shaft pulses are counted than second line pulses; and coupling means, responsive to said counter means, for coupling the start winding to the line voltage source when said counter overflows and for decoupling said start winding from said line voltage source when said counter underflows.

2. The starting control circuit of claim 1 wherein said shaft pulse generating means includes:

a plurality of P magnetized portions substantially equally angularly spaced around the circumference of the shaft, wherein P is an integer equal to the number of poles of the motor; and a Hall effect sensor situated adjacent the shaft such that said sensor generates a pulse each time one of said magnetized portions passes by said sensor.

3. A method of controlling the start winding of an alternating current (AC) motor, the motor including a stator having a plurality of stator windings and further including a rotor mounted on a rotatable shaft, the motor being adapted to be coupled to an AC line voltage source, said method comprising:

generating a first shaft pulse each time the shaft turns an amount equal to 360 degrees divided by the number of poles of the motor;

generating a first line pulse at a fixed proportional rate relative to the line voltage frequency;

multiplying each first shaft pulse by a first constant, M, to generate M second shaft pulses for each first shaft pulse;

multiplying each first line pulse by a second constant, N, to generate N second line pulses for each first line pulse;

providing the second line pulses to an up/down counter to cause the counter to count up and providing the second shaft pulses to the up/down counter to cause the counter to count down; and coupling the start winding to the line voltage source when the counter overflows and decoupling the start winding from the line voltage source when the counter underflows.

4. The method of claim 3 including the step of decoupling the start winding from the line voltage source when a predetermined trip-out ratio of N/M is reached.

5. The method of claim 3 wherein said fixed proportional rate is twice the line voltage frequency.

6. A method of controlling a start winding of an alternating current (AC) split phase motor, the motor including a stator having a plurality of poles wherein P is the number of poles, the motor including a rotor mounted on a rotatable shaft, the motor being adapted to be coupled to an AC line voltage source, said method comprising:

providing a rotor shaft with P magnetized portions equiangularly spaced around the circumference of the shaft;

providing line voltage excitation to the motor so as to effect rotation of the shaft upon energization of a start winding;

generating a first shaft pulse each time one of the magnetized portions moves past a predetermined point;

generating a first line pulse each time the line voltage excitation completes a line voltage cycle;

multiplying each first shaft pulse by a first constant, M, to generate N second shaft pulses for each first shaft pulse;

multiplying each line pulse by a second constant, N, to generate N second line pulses for each first line pulse;

providing the second line pulses to an up/down counter to cause the counter to count up and providing second shaft pulses to the up/down counter to cause the counter to count down; and coupling the start winding to the line voltage source when the counter overflows and decoupling the start winding from the line voltage source when the counter underflows.

7. The method of claim 6 including the step of decoupling the start winding from the line voltage source when a trip-out ratio of N/M is reached.

8. The method of claim 5 wherein said fixed proportional rate is twice the line frequency.

9. A method of controlling the start winding of an alternating current (AC) motor, the motor including a stator having a plurality of poles P, said motor including a rotor mounted on a rotatable shaft, the motor being adapted to be coupled to an AC line voltage source, said method comprising:

providing the shaft with P magnetized portions angularly spaced around the circumference of the shaft;

energizing the stator with line voltage to effect rotation of the shaft when the start winding is energized;

generating a first shaft pulse each time one of the P magnetized portions moves past a predetermined point;

generating a first line pulse each time the line voltage completes a line voltage cycle;

multiplying each first shaft pulse by a first constant, M, to generate M second shaft pulses for each first shaft pulse;

multiplying each line pulse by a second constant, N, to generate N second line pulses for each first line pulse;

providing the second line pulses to an up/down counter to cause the counter to count up and providing the second shaft pulses to the up/down counter to cause the counter to count down; and coupling the start winding to the line voltage source when the counter overflows and decoupling the start winding from the line voltage source when the counter underflows.

10. The method of claim 9 including the step of decoupling the start winding from the line voltage source when a trip-out ratio of N/M is reached.

11. The method of claim 9 wherein said fixed proportional rate is twice the line frequency.

* * * * *